United States Patent [19]

Nagano

[11] Patent Number: 4,555,008
[45] Date of Patent: Nov. 26, 1985

[54] DAMPER DISC SUITABLE FOR AUTOMOBILE CLUTCH

[75] Inventor: Tamio Nagano, Hirakata, Japan

[73] Assignee: Kabushiki Kaisha Daikin Seisakusho, Neyagawa, Japan

[21] Appl. No.: 508,094

[22] Filed: Jun. 27, 1983

[30] Foreign Application Priority Data

Jun. 29, 1982 [JP] Japan .................................. 57-113656

[51] Int. Cl.⁴ .............................................. F16D 3/14
[52] U.S. Cl. .............................. 192/106.1; 192/30 V; 192/70.18; 464/27
[58] Field of Search ............... 192/106.1, 106.2, 70.17, 192/70.18, 30 V; 464/24, 27, 81

[56] References Cited

U.S. PATENT DOCUMENTS

| | | | |
|---|---|---|---|
| 700,246 | 5/1902 | Schultz | 464/81 |
| 1,734,043 | 11/1929 | Nelson | 464/27 |
| 1,914,841 | 6/1933 | Wood | 192/70.18 |
| 2,316,820 | 4/1943 | Thelander | 192/106.2 |
| 2,337,134 | 12/1943 | Thelander | 192/106.2 |
| 2,380,672 | 7/1945 | Opitz | 464/27 |
| 2,513,379 | 7/1950 | Thelander | 464/27 X |
| 2,520,180 | 8/1950 | Thelander | 464/27 X |
| 3,242,693 | 3/1966 | Paulsen | 464/81 |
| 4,095,485 | 6/1978 | Hiersig | 464/27 |
| 4,148,200 | 4/1979 | Schallhorn et al. | 192/106.1 |

FOREIGN PATENT DOCUMENTS

| | | | |
|---|---|---|---|
| 600532 | 7/1934 | Fed. Rep. of Germany | 464/24 |
| 2528774 | 1/1976 | Fed. Rep. of Germany | 464/27 |
| 591913 | 7/1925 | France | 464/27 |
| 156526 | 12/1981 | Japan | 192/106.1 |
| 2036925B | 1/1983 | United Kingdom | 192/106.1 |

Primary Examiner—William L. Freeh
Assistant Examiner—Paul F. Neils
Attorney, Agent, or Firm—Armstrong, Nikaido, Marmelstein & Kubovcik

[57] ABSTRACT

A hydraulic dampened clutch plate having a hub, a hub flange, a friction disc plate and pins on the hub flange and disc plate spaced radially outwardly from the hub and spaced equally circumferentially around the hub, the pins on the flange and disc plate being joined by a cylinder and piston, the cylinder being fluid tight and the piston having a valve there in, divides the cylinder into two chambers, the piston valve interconnecting the chambers to dampening vibration or the piston moves in and out of the cylinder because of relative movement between the hub flange and the disc plate.

3 Claims, 5 Drawing Figures

DAMPER DISC SUITABLE FOR AUTOMOBILE CLUTCH

FIELD OF THE INVENTION

This invention relates to a damper disc for use in an automobile, in which a disc plate perpendicular to a hub center axis is supported rotatably at a central hub.

DESCRIPTION OF THE PRIOR ART

As a conventional damper disc suitable for a clutch disc for use in an automobile, a construction as shown in FIG. 1, for example, utilizing coil springs or rubber elastic bodies is well known. In FIG. 1, a central hub 1 has an integral annular flange 2 and fits onto an output shaft (not shown) through a spline 3 formed on an inner peripheral surface thereof. A disc plate 4, parallel to the annular flange 2, is rotatably supported by the hub 1. A facing 5, secured to an outer peripheral portion of the plate 4, is so deviced as to be sandwiched between a flywheel and a pressure plate. Plural window holes 6 are provided on the same circumference of the plate 4, and window holes 7 are also provided on the corresponding annular flange 2. In each pair of the window holes 6,7, a circumferential compression coil spring 8 or a rubber elastic body 9 is fitted.

In the above-mentioned construction, when a torque is transmitted from the flywheel side to the facing 5 in the direction of the arrow $X_1$, the torque is transmitted to the output shaft through the plate 4, spring 8, rubber elastic bodies 9, the flange 2, and the hub 1.

A conventional damper disc, which utilizes coil spring 8 and rubber elastic bodies 9, has the characteristic that a twisting torque of the damper disc slowly increases with an increase in a relative twisting angle of the disc plate 4 in relation to the hub 1. A vibration absorbing effect is obtained by utilizing this characteristic. In such a conventional damper disc, however, the value of twisting torque has no relation to a change in the twisting angular velocity of the disc plate 4 in relation to the hub 1. Consequently, such a disc will display the same torsional characteristic for both cases, i.e. when an impactive torque is applied on the facing 5 from outside and when a comparatively moderate torque is applied thereon. On the contrary, it is known that normally a vibration having a larger angular velocity is mainly produced in a high-load operation, for example, and a vibration having a comparatively small angular velocity is produced in an idling operation. For a conventional damper disc in such a case, the twisting torque increases too large to sufficiently absorb the vibration in the idling operation when characteristics of the spring 8 and the elastic body 9 are determined so as to obtain an optimum vibration absorbing effect under high-load operation, for example, and the twisting torque decreases too small to sufficiently absorb the vibration under the high-load operation in the reverse case.

Also in a conventional damper disc, a friction material 10, such as a friction washer, is interposed between the flange 2 and the plate 4 because a hysteresis torque is generated depending on the relation between an applied torque and a twisting angle. In this construction, however, a constant hysteresis is not only obtainable independently of a twisting angle but a constant hysteresis is obtainable also independently of a twisting angular velocity. Therefore, regarding the hysteresis in a conventional damper disc, the vibration absorbing capacity has inevitably been insufficient during a high-speed operation, for example, when its characteristics have been set so as to improve the starting feeling in a transition stage from idling condition to starting condition.

Damper discs utilizing viscosity of fluid have already been known, however, it has been difficult to put them to practical use because their construction has generally comprised fluid, which is sealed in a damper disc, resulting in a complicated construction and a high manufacturing cost.

SUMMARY OF THE INVENTION

An object of this invention is to provide a simply-constructed and easily-manufacturable damper disc, in which a twisting torque changes corresponding to a change in a twisting angular velocity, an optimum vibration absorbing effect is always obtainable, and generation of mechanical noise is prevented.

In order to accomplish the above object, this invention is characterized in that a cylindrical shock absorber having fluid sealed therein is provided between a hub and a disc plate so as to absorb a torsional vibration torque generated between the hub and the disc plate.

DETAILED DESCRIPTION OF THE INVENTION

Figure 2:
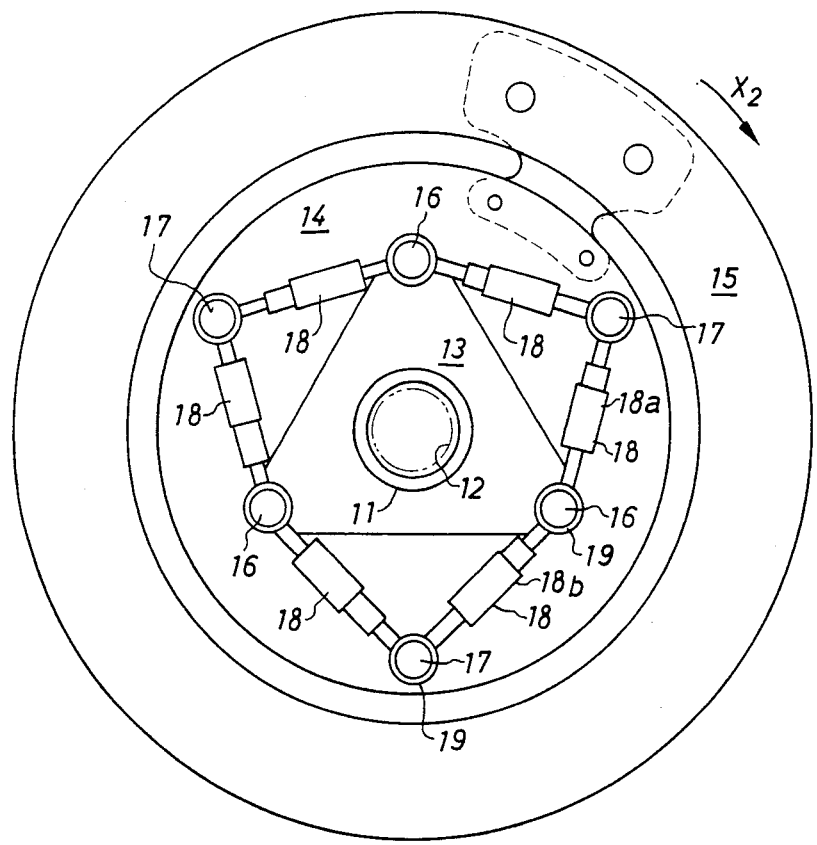
FIG. 2 is a schematic front view of a damper disc according to this invention.

In FIG. 2, a central hub 11 is provided with a spline 12 on its inner peripheral surface in order to fit onto the output shaft, and provided integrally radially with an approximately regularly triangular flange 13 on its outer peripheral surface. Further, a sheet or disc plate 14 parallel (including approximately parallel) to the flange 13 is rotatably supported on the outer peripheral surface of the hub 11, and a facing 15 is secured to an outer peripheral surface of the plate 14. Moreover, pins 16 parallel to the center axis are integrally provided on each vertex of the flange 13 respectively. Three pins 17 are integrally provided at circumferentially equal spaces and in a part of the disc plate 14, which is outwardly of flange 13 so as not to interfere with rotating motion of the flange 13. Shock absorbers 18 are pivotally installed between each pair of the pins 16, 17 both fore and aft of the pins, there being a total of six shock absorbers in the embodiment shown.

Figure 3:
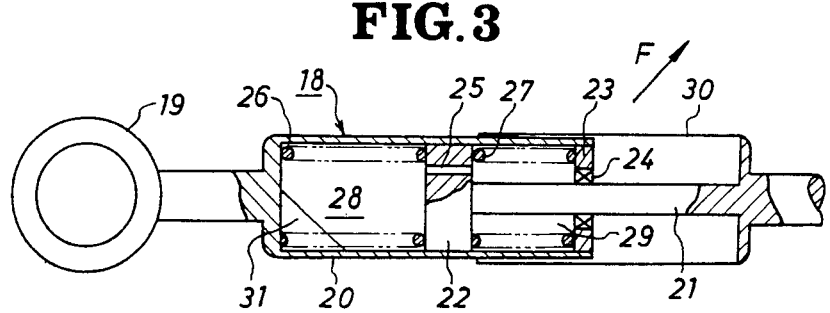
FIG. 3 is a partially vertical sectional side view showing an example of a shock absorber in this invention.

Each shock absorber 18 has on both ends supporting portions 19, 19 which pivotally fit onto the pins 16, 17, one supporting portion 19 being formed integrally with a pressure tube 20 and the other supporting tube 19 (omitted in FIG. 3) being interconnected integrally to a piston 22 fitting slidingly in the tube 20, as seen from FIG. 3. The right end of the tube 20 is closed by a cover 23 which slidingly supports piston rod 21 through an oil seal 24 while maintaining liquid tightness. The tube 20 is approximately filled with oil leaving a space 31 in consideration of a decrease in a volume in the tube 20 caused by inserting the rod 21 into the tube 20, and the oil goes back and forth between two chambers 28, 29 through port 25 in the piston 22 when the piston 22 slides forward and backward. The arrow F indicates the direction in which a centrifugal force is applied to shock absorber 18 when the damper disc is rotated. Two coil springs 26, 27 are compressed in tube 20 at the opposite sides of piston 22, springs 26, 27 are set in balance when the piston 22 is situated in the middle position of the tube 20. Cover 30 integrally fixed to the rod 21.

Now, functions of the damper disc will be described hereunder. Since a torsion between the disc plate 14 and the hub 11 is correlative, it may be considered for explanatory reasons that the hub 11 is fixed and the plate 14 is applied a torque in the direction of the arrow mark $X_2$. When the plate 14 begins to rotate in the direction of the arrow $X_2$ relatively to the hub 11, a shock absorber 18a among the shock absorbers 18, which is installed where a distance between the pins 16, 17 tends to be shortened, is compressed; and a shock absorber 18b among them, which is installed where a distance between the pins 16,17 tends to be lengthened, is expanded. In this instance, regarding the compressed absorber 18a, the piston 22 slides toward left direction in the tube 20 to compress the spring 26 in the left chamber 28 and simultaneously to make a part of oil in the left chamber 28 flow into the right chamber 29 through the port 25, as seen from FIG. 3. On the other hand, regarding the expanded absorber 18b, the piston 22 slides toward right direction in the tube 20 to compress the spring 27 in the right chamber 29 and simultaneously to make a part of oil in the right chamber 29 flow into the left chamber 28 through the port 25.

Figure 1:
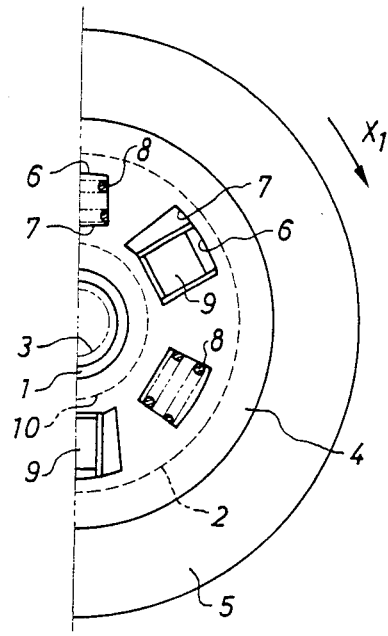
FIG. 1 is a partial front view showing a conventional damper disc.
Figure 5:
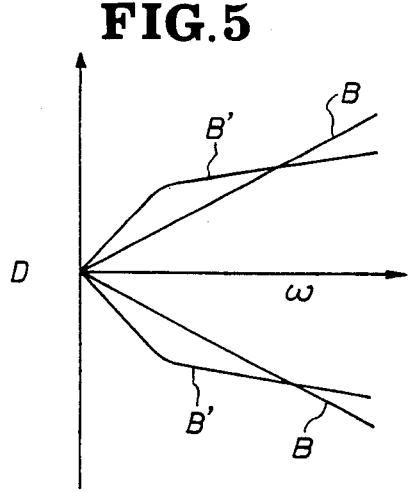
FIG. 5 is a graph showing characteristics of the relation between angular velocity and damping force.
Figure 4:
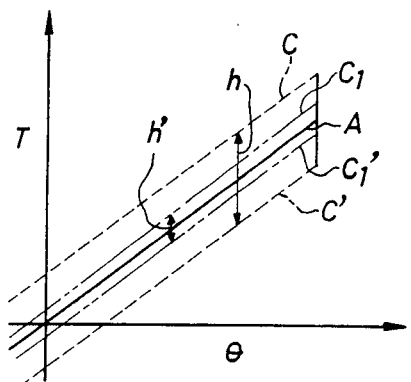
FIG. 4 is a graph showing characteristics of relation between twisting angle and twisting torque of the damper disc.

In this instance, the characteristic of twisting angle and twisting torque excluding a fluid resistance of oil passing through the port 25 is assumed, for example, as the solid line A of FIG. 4, where $\theta$ is the twisting angle and T is the twisting torque. Further, a relation between a damping force caused by fluid resistance of oil and an angular velocity of damper is assumed, for example, as the straight line B of FIG. 5, where $\omega$ is the angular velocity and D is the damping force.

When a torque in the direction of arrow $X_2$ is applied with an angular velocity $\omega$ kept constant in the damper disc which is set to the above characteristics, the characteristic of twisting angle $\theta$ and twisting torque T turns into the broken line C in FIG. 4. When a torque is applied in the direction reverse to the arrow $X_2$, the characteristic turns into the broken line C'. Thus, the hysteresis torque h is generated between the both broken lines C & C'. When the angular velocity $\omega$ becomes smaller, the characteristics such as, for example, the two-dot chain lines $C_1$ & $C'_1$ become obtainable and its hysteresis torque h' becomes smaller. Namely, the smaller hysteresis h' is obtainable for a torsional vibration of small angular velocity $\omega$ such as in idling operation, and the larger hysteresis h is obtainable for a larger velocity $\omega$.

Further, in the above-mentioned damper disc, its torsional rigidity increases when an impactive torque is applied and the torsional rigidity decreases when a moderate torque is applied, owing to a perculiar characteristics of a shock absorber utilizing fluid friction. Consequently, the torsional rigidity becomes small when the operating condition is close to no-load running such as the idling, and the torsional rigidity becomes large such as when a large change in twisting torque is shockingly applied.

As mentioned above, according to this invention the cylindrical shock absorber 18 sealing fluid (oil) therein is installed between the hub 11 and the disc plate 14 so as to absorb the twisting vibration torque generated between the hub 11 and the disc plate 14, so that the twisting torque becomes changeable in accordance with a change in the twisting angular velocity $\omega$ of the disc plate 14 relative to the hub 11. Thus, optimum characteristics of hysteresis torque and torsional rigidity, i.e. a good vibration absorbing effect, can be obtained and mechanical noise can be prevented. Further, owing to the construction in which the shock absorber forming a unit is installed between the hub 11 and the disc plate 14, the damper disc has the advantages that it is simple in construction and assembly and can be manufactured easily.

The number of absorbers 18 may be more than six and the fluid sealed in the absorber 18 may be other than oil and may be, for example, gas. Further, an absorber 18 having a characteristic such as of the characteristic curve B' (saturating characteristic) in FIG. 5 may be used. In case when the absorber 18 actuating in the reverse direction as shown in FIG. 3 by installing the shock absorbers in reverse, either one of the coil springs 26, 27 may be removed. Shock absorbers 18 having no coil springs 26, 27 may be installed in a damper having the conventional torsion springs 8 and elastic bodies 9. Further, it is possible to use a construction in which the flange 13 and the absorber 18 are sandwiched between two integrally formed disc plates.

What is claimed is:

1. A hydraulically dampened clutch plate having a central hub with a spline on its inner peripheral surface and an integral flange extending radially therefrom, said radial flange having a plurality of pins equally spaced radially from said hub and equally spaced circumferentially around said hub and extending parallel to the axis of said hub, a friction disc plate extending radially outwardly of said hub, parallel to said hub flange, and rotatably supported on the outer peripheral surface of said hub, said friction disc plate having mounted on at least one of its faces, outwardly of said radial hub flange and said hub flange pins, a friction facing, a plurality of friction disc plate pins equally spaced on said disc radially from said hub and equally spaced circumferentially around said hub on said friction disc plate, said friction disc plate pins being each spaced equidistant from the adjacent pair of radial flange pins when such clutch plate is at rest and a plurality of shock absorbers interconnecting each of said friction disc plate pins with the adjoining each of said pair of flange pins, each of said shock absorbers including a fluid tight cylinder pivotally connected to one of an adjoining disc plate pin and flange pin, a piston rod pivotally connected to the other of said adjoining disc plate pins and flange pin, a piston on said piston rod and slidable in said fluid tight cylinder and forming chambers in said cylinder at the opposite sides of said piston, a port through said piston interconnecting said chambers in said cylinder at the opposite sides of said piston, a compression spring in each of said chambers for compression between the piston face and the end wall of said cylinder as said piston is moved therein and a hydraulic fluid sealed in said cylinder for flow through said piston in a first direction when said hub flange pins and said friction plate pins are rotated about said hub toward each other and for flow in the opposite direction when said hub flange pins and said friction plate pins are rotated away from each other.

2. A hydraulically dampened clutch plate, as recited in claim 1, in which each of said pins has pivotally connected thereto one end of two shock absorbers the other end of said two shock absorbers being pivotally connected, respectively, to the pin immediately preceding and to the pin immediately following.

3. A hydraulically dampened clutch plate, as recited in claim 1, in which the pivotal connections of said shock absorbers to said pins are alternated so that each of said pins has pivoted thereto the piston rod end of one shock absorber and the cylinder end of another shock absorber.

* * * * *